United States Patent
Ito

(10) Patent No.: US 7,500,756 B2
(45) Date of Patent: Mar. 10, 2009

(54) MONITORING APPARATUS

(75) Inventor: Takanori Ito, Mie (JP)

(73) Assignees: Sumitomo Wiring Systems, Ltd., Mie (JP); Autonetworks Technologies, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 301 days.

(21) Appl. No.: 11/128,155

(22) Filed: May 13, 2005

(65) Prior Publication Data

US 2005/0270500 A1 Dec. 8, 2005

(30) Foreign Application Priority Data

May 21, 2004 (JP) ............................. 2004-152114

(51) Int. Cl.
- G03B 21/26 (2006.01)
- H04N 7/18 (2006.01)
- H04N 9/47 (2006.01)
- G09G 5/00 (2006.01)

(52) U.S. Cl. ............................. 353/30; 353/13; 353/94; 353/122; 348/36; 348/149; 348/159; 348/218.1; 340/461; 345/1.3

(58) Field of Classification Search .................... 353/99, 353/13, 94, 98, 122, 14, 29, 28, 37, 30; 348/61, 348/142, 143, 147, 148, 149, 159, 77, 115, 348/744, 218.1; 345/1.1, 1.3, 5, 7, 8; 359/13, 359/69, 269, 451, 452, 630, 632, 634; 349/11; 382/115, 117, 118; 340/425.5, 575, 576, 340/461; 362/276, 464, 466, 503, 802; 396/427
See application file for complete search history.

(56) References Cited

U.S. PATENT DOCUMENTS

| | | | |
|---|---|---|---|
| 6,593,960 B1 * | 7/2003 | Sugimoto et al. | 348/148 |
| 2004/0051634 A1 * | 3/2004 | Schofield et al. | 340/461 |
| 2004/0061787 A1 * | 4/2004 | Liu et al. | 348/218.1 |
| 2006/0227138 A1 * | 10/2006 | Oizumi | 345/428 |

* cited by examiner

Primary Examiner—Rochelle-Ann J Blackman
(74) Attorney, Agent, or Firm—Oliff & Berridge, PLC

(57) ABSTRACT

A monitoring apparatus includes plural imaging units; a viewpoint conversion unit making viewpoint conversion of each imaged picture of the plural imaging units into an overhead picture with the same depression angle, respectively; and a picture composite unit joining each overhead picture obtained from the viewpoint conversion unit to superimpose the same scene portion of each overhead picture, and generating a wide overhead picture. The picture composite unit adopts a picture of a superimposed portion in the overhead picture with the highest picture quality of the superimposed portion among each overhead picture related to the superimposed portion as a picture of the superimposed portion of the wide overhead picture.

6 Claims, 3 Drawing Sheets

MONITORING APPARATUS

BACKGROUND OF THE INVENTION

1. Field of the Invention

The present invention relates to a monitoring apparatus for making viewpoint conversion of each of the imaged pictures of plural imaging units into overhead pictures with the same depression angle and joining their overhead pictures and generating a wide overhead picture.

2. Description of the Related Art

In recent years, a monitoring apparatus in which the periphery of a vehicle is imaged by cameras installed in the vehicle and the imaged pictures are displayed on a display device installed in the vehicle is becoming prevalent. As the cameras, cameras for imaging all the blind corners of the vehicle, for example, a camera for imaging a portion close to the front of the vehicle or a camera for imaging a corner portion of a bumper have been proposed and in the future, it is expected that many cameras will be installed in the vehicle.

In such a monitoring apparatus, means for making viewpoint conversion of an imaged picture of a camera into, for example, an overhead picture from just above and displaying the picture in order to facilitate a grasp of a sense of distance between my vehicle and an obstruction on a display picture has been proposed (related art 1).

Also, in such a monitoring apparatus, means for imaging a picture showing a wide range of the periphery of a vehicle using a wide-angle camera and scrolling and displaying the wide imaged picture on a display screen, for example, according to the amount of handle rotation has been proposed (related art 2).

When the overhead picture of the related art 1 can also be acquired as a wide picture (that is, a wide overhead picture) as described in the related art 2, for example, as described in the related art 2, a wide range of blind corner information can be provided on the display screen and usefulness is enhanced.

SUMMARY OF THE INVENTION

However, in the case of acquiring the overhead picture of the related art 1 as the wide overhead picture, there is a disadvantage of increasing cost when the wide-angle camera is used as described in the related art 2. In consideration of a tendency to install many cameras in the vehicle in the future, the wide overhead picture can desirably be acquired at low cost by utilizing the imaged pictures of their cameras.

In that case, quality of the overhead picture obtained by making viewpoint conversion as described in the related art 1 may degrade in the case of making viewpoint conversion from the imaged picture of the camera, so that a wide overhead picture of high quality can desirably be acquired by minimizing degradation in picture quality.

It is an object of the invention to provide a monitoring apparatus capable of acquiring a wide overhead picture of high quality at low cost using imaged pictures of plural cameras.

According to one aspect of the invention, there is provided with a monitoring apparatus including: plural imaging units; a viewpoint conversion unit making viewpoint conversion of each imaged picture of the plural imaging units into an overhead picture with the same depression angle, respectively; and a picture composite unit joining each overhead picture obtained from the viewpoint conversion unit to superimpose the same scene portion of each overhead picture, and generating a wide overhead picture, wherein the picture composite unit adopts a picture of a superimposed portion in the overhead picture with the highest picture quality of the superimposed portion among each overhead picture related to the superimposed portion as a picture of the superimposed portion of the wide overhead picture.

By thus configuration, viewpoint conversion of each of the imaged pictures of plural imaging units is made into overhead pictures with the same depression angle, respectively, and each of their overhead pictures is joined so as to superimpose the same scene portions of their overhead pictures and a wide overhead picture is generated, so that the wide overhead picture showing a wide range can be acquired at low cost using each of the imaged pictures of the plural cameras.

A picture of the superimposed portion in the overhead picture with the highest picture quality of the superimposed portion among each of the overhead pictures related to the superimposed portion is adopted as a picture of the superimposed portion of the wide overhead picture, so that the picture of the superimposed portion of the wide overhead picture can be formed in a picture in which distortion in picture quality or degradation in picture quality is small, and the wide overhead picture with high quality can be acquired.

According to another aspect of the invention, an overhead picture in which an amount of depression angle change before and after the viewpoint conversion is smallest is selected as the overhead picture with the highest picture quality of the superimposed portion.

By thus configuration, the overhead picture in which the amount of depression angle change before and after the viewpoint conversion is smallest is selected as the overhead picture with the highest picture quality of the superimposed portion, so that the overhead picture with the highest picture quality of the superimposed portion can be selected from among each of the overhead pictures related to the superimposed portion of the wide overhead picture by a simple criterion.

According to another aspect of the invention, the overhead picture in which resolution of the superimposed portion is highest is selected as the overhead picture with the highest picture quality of the superimposed portion.

By thus configuration, the overhead picture in which resolution of the superimposed portion is highest is selected as the overhead picture with the highest picture quality of the superimposed portion, so that the overhead picture with the highest picture quality of the superimposed portion can be selected from among each of the overhead pictures related to the superimposed portion of the wide overhead picture by a simple criterion.

According to another aspect of the invention, the overhead picture in which the same scene portion shown in a picture portion before the viewpoint conversion of the superimposed portion is largest shown is selected as the overhead picture with the highest picture quality of the superimposed portion.

By thus configuration, the overhead picture in which the same scene portion shown in a picture portion before the viewpoint conversion of the superimposed portion is largest shown is selected as the overhead picture with the highest picture quality of the superimposed portion, so that the overhead picture with the highest picture quality of the superimposed portion can be selected from among each of the overhead pictures related to the superimposed portion of the wide overhead picture by a simple criterion.

According to another aspect of the invention, the overhead picture in which distortion of a picture of the superimposed portion is smallest is selected as the overhead picture with the highest picture quality of the superimposed portion.

By thus configuration, the overhead picture in which distortion of a picture of the superimposed portion is smallest is selected as the overhead picture with the highest picture quality of the superimposed portion, so that the overhead picture with the highest picture quality of the superimposed portion can be selected from among each of the overhead pictures related to the superimposed portion of the wide overhead picture by a simple criterion.

According to another aspect of the invention, the plural imaging units are set in a vehicle. The plural imaging units image the periphery of the vehicle.

By thus configuration, plural imaging units are set in a vehicle and image the periphery of the vehicle, so that a wide overhead picture in which the periphery of the vehicle is imaged can be acquired and the wide overhead picture of the periphery of the vehicle can be provided for a passenger of the vehicle.

DESCRIPTION OF THE PREFERRED EMBODIMENTS

Embodiment

Figure 1:
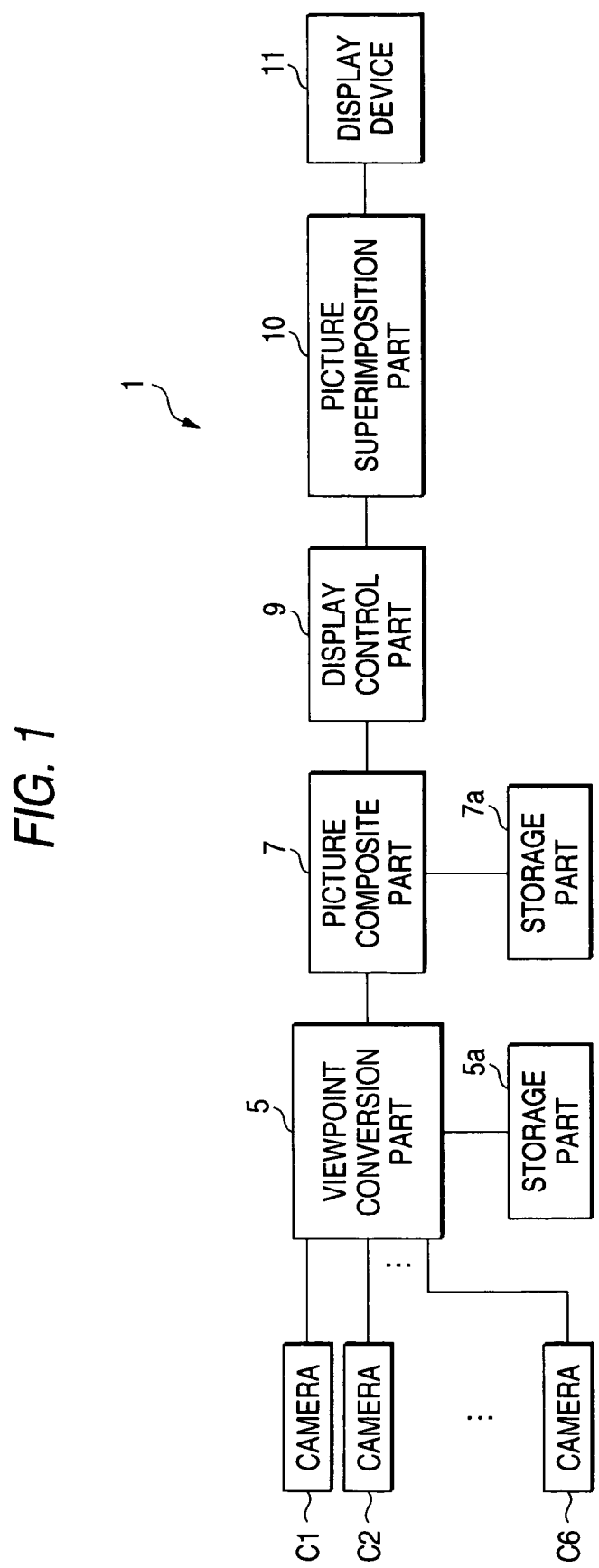
FIG. 1 is a configuration diagram of a monitoring apparatus according to an embodiment of the invention.
Figure 2:
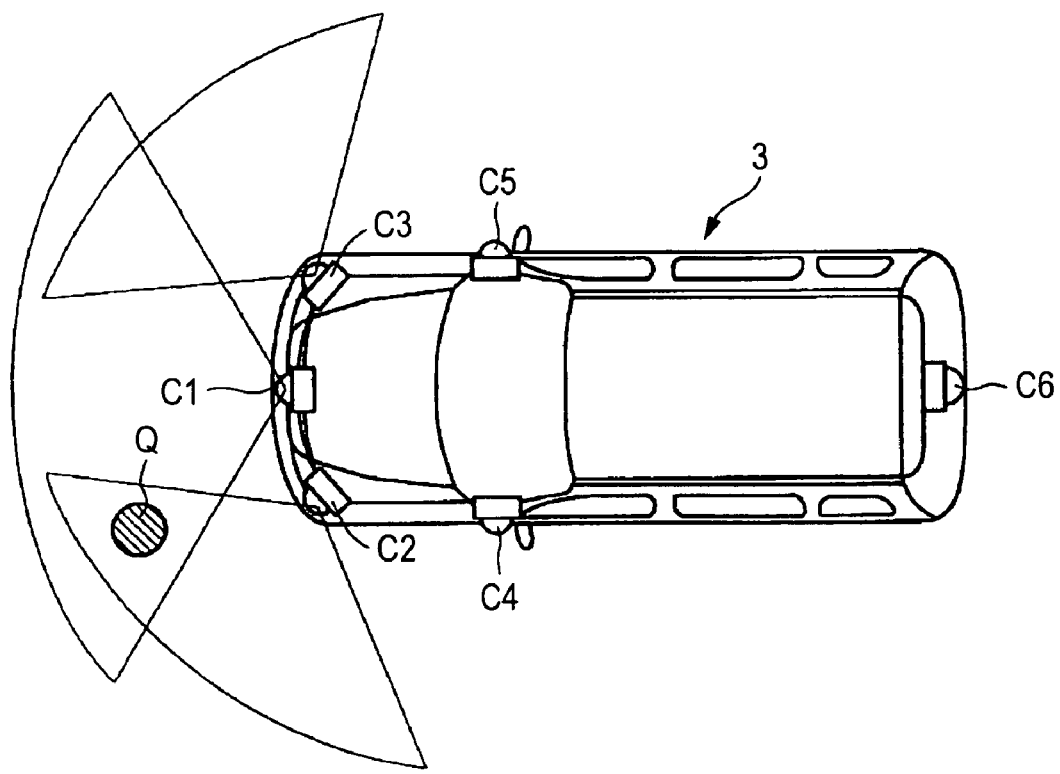
FIG. 2 is a plan view showing an installation state of each camera used in the monitoring apparatus according to the embodiment of the invention in a vehicle.
Figure 3:
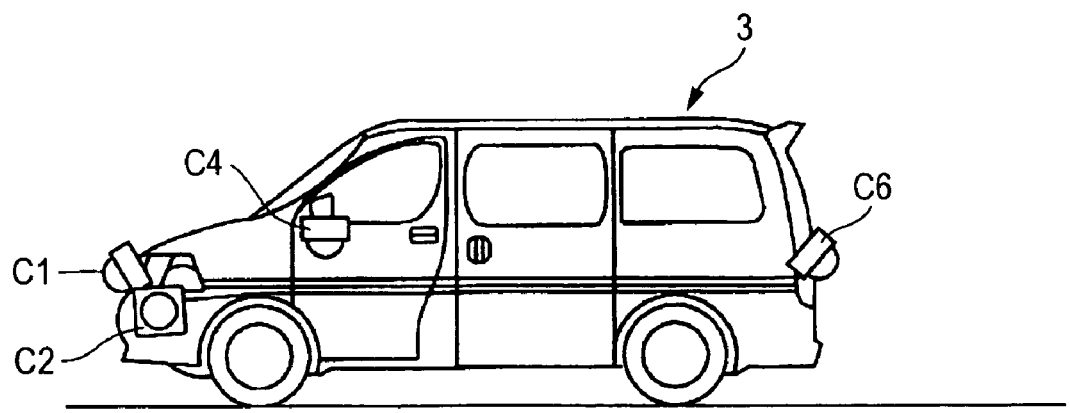
FIG. 3 is a side view showing an installation state of each camera used in the monitoring apparatus according to the embodiment of the invention in the vehicle.

As shown in FIGS. 1 to 3, a monitoring apparatus 1 according to this embodiment includes plural cameras (imaging units) c1 to c6 installed in a vehicle 3, a viewpoint conversion part (viewpoint conversion unit) 5 for making viewpoint conversion of each of the imaged pictures (camera video) of the plural cameras c1 to c6 into overhead pictures with the same depression angle, respectively, a picture composite part (picture composite unit) 7 for joining plural overhead pictures obtained from the viewpoint conversion part 5 and generating an overhead picture (wide overhead picture) shown in a wide range, a display control part 9 for selecting a picture displayed on a display device 11 from among each of the overhead pictures and the wide overhead picture obtained from each of the processing parts 5, 7 based on vehicle information from the vehicle 3, a picture superimposition part 10 for superimposing a predetermined picture for superimposition (for example, an icon of the vehicle) on the picture selected by the display control part 9, and the display device 11 for displaying the picture obtained from the picture superimposition part 10.

Here, the camera c1 is installed in the front center of the vehicle 3 and the imaging direction is directed in the front oblique lower direction (for example, a depression angle of about 45°) and a picture (an imaged picture with a depression angle of about 45°) of a portion close to the front of the vehicle 3 is imaged. The camera c2 is installed in the front left corner of the vehicle 3 and the imaging direction is directed in the left oblique front horizontal direction (for example, a depression angle of about 0°) and a picture (an imaged picture with a depression angle of about 0°) of the periphery of the front left corner of the vehicle 3 is imaged. The camera c3 is installed in the front right corner of the vehicle 3 and the imaging direction is directed in the right oblique front horizontal direction (for example, a depression angle of about 0°) and a picture (an imaged picture with a depression angle of about 0°) of the periphery of the front right corner of the vehicle 3 is imaged. The camera c4 (camera c5) is installed in a left door mirror (right door mirror) and the imaging direction is directed just under the door mirror and a picture of the periphery just under the left door mirror (right door mirror) is imaged. The camerac6 is installed in the back center of the vehicle 3 and the imaging direction is directed in the back oblique lower direction and a picture of a portion close to the back of the vehicle 3 is imaged.

The viewpoint conversion part 5 respectively makes viewpoint conversion of imaged pictures g1 to g6 (see FIG. 4A) of each of the cameras c1 to c6 into overhead pictures (overhead pictures with depression angles of about 90°) f1 to f6 (see FIG. 4B) appearing to be imaged, for example, from just above using, for example, conversion tables for view point conversion. The conversion tables for viewpoint conversion are prepared every imaged pictures g1 to g6 of each of the cameras c1 to c6, and are stored in a storage part 5a such as ROM disposed in the viewpoint conversion part 5. Incidentally, in FIGS. 4A-4C for the sake of convenience, only the imaged pictures g1 to g3 and the overhead pictures f1 to f3 are illustrated and illustration of the imaged pictures g4 to g6 and the overhead pictures f4 to f6 is omitted.

Incidentally, here, the imaged pictures of each of the cameras c4, c5 are imaged pictures (that is, overhead pictures imaged from just above originally) g4, g5 imaged from just above, so that viewpoint conversion processing with respect to the imaged pictures g4, g5 of each of the cameras c4, c5 may be omitted.

Figure 4A:
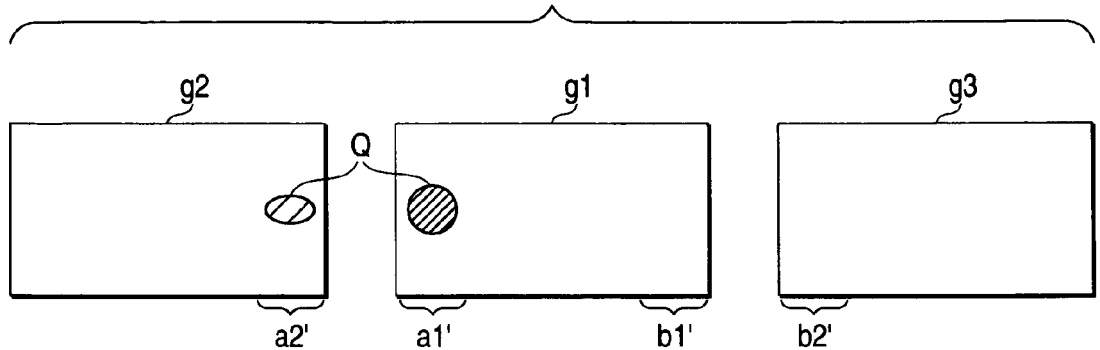
FIG. 4A shows one example of imaged pictures g1 to g3 of each of the cameras c1 to c3 of FIG. 1.
Figure 4B:
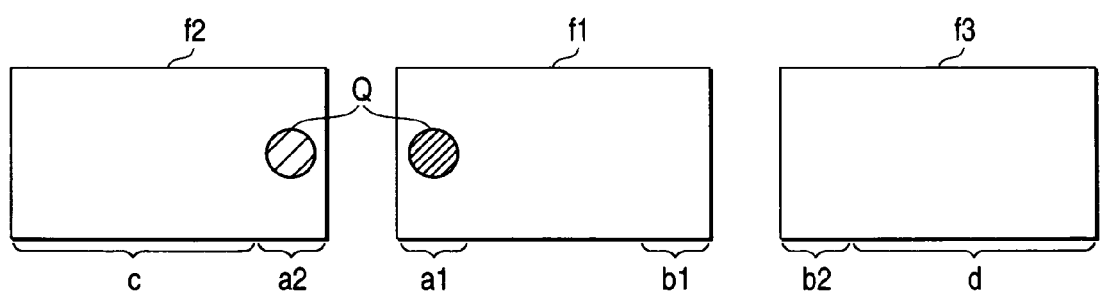
FIG. 4B shows overhead pictures f1 to f3 obtained by making viewpoint conversion of their imaged pictures g1 to g3.
Figure 4C:
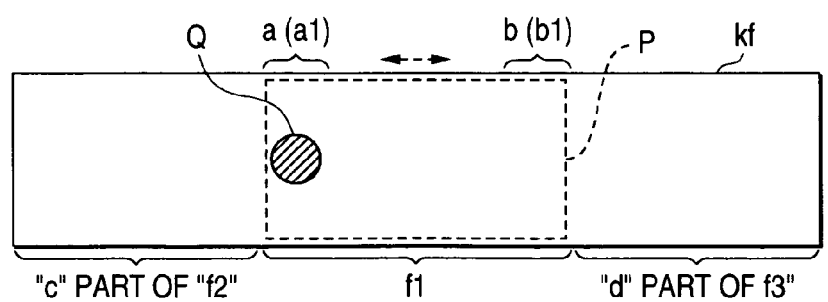
FIG. 4C shows a wide overhead picture kf generated by joining their overhead pictures f1 to f3.

As shown in FIGS. 4B and 4C, the picture composite part 7 joins plural overhead pictures (here, the overhead pictures f1 to f3 obtained by making viewpoint conversion of the imaged pictures g1 to g3 of each of the cameras c1 to c3) obtained from the viewpoint conversion part 5 so as to superimpose the same scene portions (portions a1, a2 each other and portions b1, b2 each other) of their overhead pictures and generates a wide overhead picture kf. In that case, the picture composite part 7 adopts a picture of the superimposed portions a1, a2 (b1, b2) in the overhead picture (specifically, for example, the overhead picture in which the amount of depression angle change before and after the viewpoint conversion is smallest) with the highest picture quality of the superimposed portions a1, a2 (b1, b2) among each of the overhead pictures f1, f2 (f1, f3) related to the superimposed portions a (b) as a picture of the superimposed portions a (b) of the wide overhead picture kf.

Incidentally, here, as described above, the overhead picture in which the amount of depression angle change before and after the viewpoint conversion is smallest is selected as the overhead picture with the highest picture quality of the superimposed portions a1, a2 (b1, b2), and this considers the fact that, generally, degradation in quality of the picture after the viewpoint change is small as the amount of depression angle change before and after the viewpoint conversion is small.

That is, here, as described above, the amount of depression angle change before and after the viewpoint conversion of the overhead picture f1 becomes about 45° since a depression angle of the imaged picture g1 before the viewpoint conversion is about 45° and a depression angle of the overhead picture f1 after the viewpoint conversion is about 90°. On the other hand, the amount of depression angle change before and after the viewpoint conversion of the overhead picture f2 (f3) is about 90° since a depression angle of the imaged picture g2 (g3) before the viewpoint conversion is about 0° and a depression angle of the overhead picture f2 (f3) after the viewpoint conversion is about 90°. Therefore, a picture of the superimposed portion a1 (b1) in the overhead picture f1 (f1) in which the amount of depression angle change before and after the viewpoint conversion is smallest among the overhead pictures f1, f2 (f1, f3) is adopted as a picture of the superimposed portion a (b) of the wide overhead picture kf. As a result of this, here, a picture in which non-superimposed portions c (d) of the overhead pictures f2 (f3) are joined to the left end (right end) of the overhead picture f1 of FIG. 4C is obtained as the wide overhead picture kf.

Incidentally, in each of the overhead pictures f1, f2 (f1, f3), sizes (scaling factors) of the overhead pictures are respectively adjusted to make viewpoint conversion so as to join mutual scenes smoothly in the case of viewpoint conversion in the viewpoint conversion part 5.

Incidentally, here, installation states (amounting angle (imaging direction) or a height of a mounting position) of each of the cameras c1 to c3 are fixed, so that the superimposed portions a (b) of each of the overhead pictures f1, f2 (f1, f3) are set at constant portions. In consideration of this, here, picture composition from each of the overhead pictures f1 to f3 to the wide overhead picture kf is performed using a conversion table for picture composition such as a lookup table. This conversion table for picture composition is stored in, for example, a storage part 7a such as ROM disposed in the picture composite part 7. By using the conversion table for picture composition thus, a processing load of the picture composition from each of the overhead pictures f1 to f3 to the wide overhead picture kf is reduced.

The display control part 9 (1) selects a picture displayed on the display device 11 from among each picture (the overhead pictures f1 to f6 and the wide overhead picture kf) obtained from each of the processing parts 5, 7 based on vehicle information from the vehicle 3 and also, (2) specifies a display range P (see FIG. 4C) displayed on the display device 11 from among the whole range of the wide overhead picture kf based on the vehicle information (for example, the amount of handle rotation) from the vehicle 3 further when the wide overhead picture kf is selected in the selection.

Specifically, in the processing of (1) described above, the display control part 9 determines a driving state of the vehicle 3 from the vehicle information from the vehicle 3 and when its driving state is, for example, the time of forward movement starting or the time of forward movement low speed, for example, the wide overhead picture (picture showing the periphery of the front of the vehicle 3) kf is selected, and when its driving state is, for example, the time of backward movement, for example, the overhead picture (picture showing a portion close to the back of the vehicle 3) f6 is selected.

Also, in the processing of (2) described above, the display control part 9 fixes, for example, a size of the display range P to the same size as a display screen size of the display device 11, and specifies a position of the display range P by displacing the position on the wide overhead picture kf from side to side according to, for example, the amount of handle rotation. That is, the display control part 9 specifies the center portion (a portion showing a portion close to the front of the vehicle 3) of the wide overhead picture kf as the display range P, for example, when the amount of handle rotation is zero, and specifies a range (a portion showing a travel direction of the vehicle 3) displaced from the center portion in the wide overhead picture kf to the left side (right side) by the distance roughly proportional to the rotation amount as the display range P when a handle is rotated to the left (right). As a result of this, the wide overhead picture kf is scrolled from side to side according to the amount of handle rotation and is displayed in the display device 11.

Incidentally, here, based on an input operation inputted to a predetermined operation input part, the display control part 9 further selects a picture specified by the input operation from among each of the pictures f1 to f6, kf obtained from each of the processing parts 5, 7 as a picture displayed on the display device 11.

The picture superimposition part 10 superimposes, for example, an icon (an imaging direction instruction icon) (not shown) indicating a direction relation between the vehicle 3 and, for example, a scene shown in a picture portion of the display range P specified or a scene shown in the overhead picture selected as a picture for superimposition on, for example, the peripheral edge portion on a picture portion of the display range P of the wide overhead picture kf specified by the display control part 9 or the overhead picture (any of f1 to f6) selected by the display control part 9.

Incidentally, here, the imaging direction instruction icon is superimposed as the picture for superimposition but instead of its icon, for example, a warning sentence (for example, "make a direct check") or a travel prediction curve of the vehicle 3 calculated from the amount of handle rotation may be superimposed.

The overhead picture (any of the overhead pictures f1 to f6 or the picture portion of the display range P of the wide overhead picture kf) on which the picture for superimposition (for example, the imaging direction instruction icon) is superimposed by the picture superimposition part 10 and selected by the display control part 9 is displayed on the display device 11. That is, when a wide overhead picture kf is selected by the display control part 9, the picture portion of the display range P of its wide overhead picture kf is displayed on the display device 11 so as to be scrolled from side to side according to, for example, the amount of handle rotation and also the picture for superimposition is superimposed on a predetermined portion (for example, the peripheral edge portion) on the display picture and is displayed and on the other hand, when an overhead picture (any of f1 to f6) is selected by the display control part 9, its overhead picture is displayed on the display device 11 and also the picture for superimposition is superimposed on a predetermined portion (for example, the peripheral edge portion) of the display picture and is displayed.

According to the monitoring apparatus 1 configured as described above, viewpoint conversion of each of the imaged pictures g1 to g3 of the plural cameras c1 to c3 is made into the overhead pictures f1 to f3 with the same depression angle, respectively, and each of their overhead pictures f1 to f3 is joined so as to superimpose the same scene portions of their overhead pictures and the wide overhead picture kf is generated, so that the wide overhead picture kf showing a wide range can be acquired at low cost using each of the imaged pictures g1 to g3 of the plural cameras c1 to c3.

Also, a picture of the superimposed portion a1 or a2 (b1 or b2) in the overhead picture with the highest picture quality of the superimposed portions a1, a2 (b1, b2) among each of the overhead pictures f1, f2 (f1, f3) related to the superimposed portions a (b) is adopted as a picture of the superimposed portions a (b) of the wide overhead picture kf, so that the picture of the superimposed portions a (b) of the wide overhead picture kf can be formed in a picture in which distortion in picture quality or degradation in picture quality is small, and the wide overhead picture kf with high quality can be acquired.

In that case, the overhead picture in which the amount of depression angle change before and after the viewpoint conversion is smallest is selected as the overhead picture with the highest picture quality of the superimposed portions a1, a2 (b1, b2) among each of the overhead pictures f1, f2 (f1, f3) related to the superimposed portions a (b) of the wide overhead picture kf, so that the overhead picture with the highest picture quality of the superimposed portions a1, a2 (b1, b2) can be selected from among each of the overhead pictures f1, f2 (f1, f3) related to the superimposed portions a (b) of the wide overhead picture kf by a simple criterion.

Also, the plural cameras c1 to c3 are set in the vehicle 3 and image the periphery of the vehicle, so that the wide overhead picture kf in which the periphery of the vehicle 3 is imaged can be acquired and the wide overhead picture of the periphery of the vehicle can be provided for a passenger of the vehicle 3.

MODIFIED EXAMPLE 1

In the embodiment described above, the overhead picture in which the amount of depression angle change before and after the viewpoint conversion is smallest is selected as the overhead picture with the highest picture quality of the superimposed portions a1, a2 (b1, b2) among each of the overhead pictures f1, f2 (f1, f3) related to the superimposed portions a (b) of the wide overhead picture kf, but instead, it may be constructed so as to select the overhead picture in which resolution of the superimposed portions a1, a2 (b1, b2) is highest. This considers the fact that as the resolution is high, a picture becomes sharp and picture quality is high.

Here (in an installation state of each of the cameras c1 to c6 of FIGS. 2 and 3), referring to FIGS. 4(a) and 4(b), with respect to resolution of the superimposed portion a1 of the overhead picture f1, the same scene portion (for example, subject matter Q represented in a road surface) shown in the superimposed portion a1 is shown on a corresponding portion a1' of the imaged picture g1 in a state in which the same scene portion is not scaled down too much in a vertical direction of a picture, and is shown on the superimposed portion a1 of the overhead picture f1 in a state in which the same scene portion is not scaled up too much in the vertical direction of the picture, and therefore the same scene portion is shown in a state in which the same scene portion is not scaled up too much in the vertical direction of the picture before and after the viewpoint conversion, so that the resolution does not reduce too much.

On the other hand, with respect to resolution of the superimposed portion a2 of the overhead picture f2, the same scene portion (for example, subject matter Q) shown in the superimposed portion a2 is shown on a corresponding portion a2' of the imaged picture g2 in a state of being scaled down relatively significantly in the vertical direction of the picture, and is shown on the superimposed portion a2 of the overhead picture f2 in a state of being scaled up relatively significantly in the vertical direction of the picture, and therefore the same scene portion is shown in a state of being scaled up relatively significantly in the vertical direction of the picture before and after the viewpoint conversion, so that the resolution reduces relatively significantly.

Therefore, the resolution of the superimposed portion a1 of the overhead picture f1 is higher than the resolution of the superimposed portion a2 of the overhead picture f2 and hence, a picture of the superimposed portion a1 of the overhead picture f1 is adopted as a picture of the superimposed portion a of the wide overhead picture kf. By similar discussion, for example, a picture of the superimposed portion b1 of the overhead picture f1 is adopted as a picture of the superimposed portion b of the wide overhead picture kf.

According to this modified example, the overhead picture in which the resolution of the picture of the superimposed portions a1, a2 (b1, b2) is highest is selected as the overhead picture with the highest picture quality of the superimposed portions a1, a2 (b1, b2) among each of the overhead pictures f1, f2 (f1, f3) related to the superimposed portions a (b) of the wide overhead picture kf, so that the overhead picture with the highest picture quality of the superimposed portions a1, a2 (b1, b2) can be selected from among each of the overhead pictures f1, f2 (f1, f3) related to the superimposed portions a (b) of the wide overhead picture kf by a simple criterion (selection criterion).

MODIFIED EXAMPLE 2

In the embodiment described above, the overhead picture in which the amount of depression angle change before and after the viewpoint conversion is smallest is selected as the overhead picture with the highest picture quality of the superimposed portions a1, a2 (b1, b2) among each of the overhead pictures f1, f2 (f1, f3) related to the superimposed portions a (b) of the wide overhead picture kf, but instead, it may be constructed so as to select the overhead picture in which the same scene portions shown in picture portions a1', a2' (b1', b2') before the viewpoint conversion of the superimposed portions a1, a2 (b1, b2) are largest shown.

This considers the fact that as a scene is large shown in a picture portion before the viewpoint conversion, picture information about its scene is large included in the picture portion before the viewpoint conversion and therefore the picture information about its scene is also large included in the picture portion after the viewpoint conversion and picture quality of the picture after the viewpoint conversion is high.

Here (in the case of an installation state of each of the cameras c1 to c6 of FIGS. 2 and 3), referring to FIGS. 4(a) and 4(b), the same scene portion (for example, subject matter Q represented in a road surface) shown in a picture portion (that is, a corresponding portion a1' of the imaged picture g1) before the viewpoint conversion of the superimposed portion a1 of the overhead picture f1 is shown in a state in which the same scene portion is not scaled down too much in a vertical direction of a picture, but the same scene portion (subject matter Q) shown in a picture portion (that is, a corresponding portion a2' of the imaged picture g2) before the viewpoint conversion of the superimposed portion a2 of the overhead picture f2 is shown in a state of being scaled down relatively significantly in the vertical direction of the picture.

Therefore, the same scene portion shown in the picture portion a1' before the viewpoint conversion of the superimposed portion a1 of the overhead picture f1 is shown larger than the same scene portion shown in the picture portion a2' before the viewpoint conversion of the superimposed portion a2 of the overhead picture f2, so that a picture of the superimposed portion a1 of the overhead picture f1 is adopted as a picture of the superimposed portion a of the wide overhead picture kf. By similar discussion, for example, a picture of the superimposed portion b1 of the overhead picture f1 is adopted as a picture of the superimposed portion b of the wide overhead picture kf.

According to this modified example, the overhead picture in which the same scene portions shown in the picture portions a1', a2' (b1', b2') before the viewpoint conversion of the superimposed portions a1, a2 (b1, b2) are largest shown is selected as the overhead picture with the highest picture quality of the superimposed portions a1, a2 (b1, b2) among each of the overhead pictures f1, f2 (f1, f3) related to the superimposed portions a (b) of the wide overhead picture kf, so that the overhead picture with the highest picture quality of the superimposed portions a1, a2 (b1, b2) can be selected from among each of the overhead pictures f1, f2 (f1, f3) related to the superimposed portions a (b) of the wide overhead picture kf by a simple criterion (selection criterion).

MODIFIED EXAMPLE 3

In the embodiment described above, the overhead picture in which the amount of depression angle change before and after the viewpoint conversion is smallest is selected as the overhead picture with the highest picture quality of the superimposed portions a1, a2 (b1, b2) among each of the overhead pictures f1, f2 (f1, f3) related to the superimposed portions a (b) of the wide overhead picture kf, but instead, it may be constructed so as to select the overhead picture in which distortion of pictures of the superimposed portions a1, a2 (b1, b2) is smallest. This considers the fact that picture quality is high as the distortion of a picture is small.

Here (in the case of an installation state of each of the cameras c1 to c6 of FIGS. 2 and 3), referring to FIGS. 4(a) and 4(b), with respect to a picture of the superimposed portion a1 of the overhead picture f1, the same scene portion (for example, subject matter Q represented in a road surface) shown in the superimposed portion a1 is not deformed (scaled up) too much in a vertical direction of the picture, so that there is not distortion too much, but with respect to a picture of the superimposed portion a2 of the overhead picture f2, the same scene portion (subject matter Q) shown in the superimposed portion a2 is deformed (scaled up) relatively significantly in the vertical direction of the picture, so that the picture is distorted relatively significantly.

Therefore, distortion of the picture of the superimposed portion a1 of the overhead picture f1 is smaller than that of the picture of the superimposed portion a2 of the overhead picture f2 and hence, the picture of the superimposed portion a1 of the overhead picture f1 is adopted as a picture of the superimposed portion a of the wide overhead picture kf. By similar discussion, for example, the picture of the superimposed portion b1 of the overhead picture f1 is adopted as a picture of the superimposed portion b of the wide overhead picture kf.

According to this modified example, the overhead picture in which the distortion of the pictures of the superimposed portions a1, a2 (b1, b2) is smallest is selected as the overhead picture with the highest picture quality of the superimposed portions a1, a2 (b1, b2) among each of the overhead pictures f1, f2 (f1, f3) related to the superimposed portions a (b) of the wide overhead picture kf, so that the overhead picture with the highest picture quality of the superimposed portions a1, a2 (b1, b2) can be selected from among each of the overhead pictures f1, f2 (f1, f3) related to the superimposed portions a (b) of the wide overhead picture by a simple criterion (selection criterion).

What is claimed is:

1. A monitoring apparatus comprising:
    plural imaging units;
    a viewpoint conversion unit making viewpoint conversion of each imaged picture of the plural imaging units into an overhead picture with the same depression angle, respectively; and
    a picture composite unit joining each overhead picture obtained from the viewpoint conversion unit to superimpose the same scene portion of each overhead picture, and generating a wide overhead picture, wherein the picture composite unit adopts a picture of a superimposed portion in the overhead picture with the highest picture quality of the superimposed portion among each overhead picture related to the superimposed portion as a picture of the superimposed portion of the wide overhead picture.

2. A monitoring apparatus according to claim 1, wherein an overhead picture in which an amount of depression angle change before and after the viewpoint conversion is smallest is selected as the overhead picture with the highest picture quality of the superimposed portion.

3. A monitoring apparatus according to claim 1, wherein the overhead picture in which resolution of the superimposed portion is highest is selected as the overhead picture with the highest picture quality of the superimposed portion.

4. A monitoring apparatus according to claim 1, wherein the overhead picture in which the same scene portion shown in a picture portion before the viewpoint conversion of the superimposed portion is largest shown is selected as the overhead picture with the highest picture quality of the superimposed portion.

5. A monitoring apparatus according to claim 1, wherein the overhead picture in which distortion of a picture of the superimposed portion is smallest is selected as the overhead picture with the highest picture quality of the superimposed portion.

6. A monitoring apparatus according to claim 1, wherein the plural imaging units are set in a vehicle, and
    wherein the plural imaging units image the periphery of the vehicle.

* * * * *